(12) United States Patent
Long

(10) Patent No.: US 6,800,975 B2
(45) Date of Patent: Oct. 5, 2004

(54) ELECTRIC MOTOR SHAFT ACCESS COVER

(75) Inventor: Norman R. Long, Tipp City, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/324,733

(22) Filed: Dec. 19, 2002

(65) Prior Publication Data

US 2004/0119352 A1 Jun. 24, 2004

(51) Int. Cl.$^7$ .................................................. H02K 5/00
(52) U.S. Cl. ...................................... 310/89; 310/67 R
(58) Field of Search ............................... 310/89, 67 R, 310/90

(56) References Cited

U.S. PATENT DOCUMENTS

| | | | | |
|---|---|---|---|---|
| 2,164,450 A | | 7/1939 | Eshbaugh et al. ..... 220/203.26 |
| 2,427,947 A | * | 9/1947 | Koch ......................... 384/251 |
| 2,744,202 A | * | 5/1956 | Horvath et al. ............... 310/71 |
| 2,836,471 A | * | 5/1958 | Luenberger ................. 384/467 |
| 3,663,849 A | * | 5/1972 | Heob .......................... 310/90 |
| 3,743,871 A | * | 7/1973 | Church ....................... 310/90 |
| 3,870,907 A | * | 3/1975 | Hoffman ...................... 310/64 |
| 4,548,334 A | | 10/1985 | Huber et al. ................ 220/293 |
| 4,612,468 A | | 9/1986 | Sturn et al. ............... 310/67 R |
| 4,753,189 A | | 6/1988 | Mastman et al. ........... 116/308 |
| 4,955,791 A | * | 9/1990 | Wrobel ........................ 417/354 |
| 5,019,738 A | * | 5/1991 | Weilbach et al. .......... 310/90.5 |
| 5,254,893 A | * | 10/1993 | Ide ................................ 310/90 |
| 5,357,163 A | * | 10/1994 | Minakuchi et al. ........... 310/90 |
| 5,796,196 A | | 8/1998 | Johnsen et al. ........... 310/68 D |
| 5,977,671 A | * | 11/1999 | Kim ............................. 310/89 |
| 6,057,615 A | | 5/2000 | Long ........................ 310/68 R |
| 6,420,810 B1 | * | 7/2002 | Jeong ........................ 310/90.5 |
| 6,655,003 B2 | * | 12/2003 | Ganser ........................ 29/596 |
| 2002/0109427 A1 | | 8/2002 | Hochhalter et al. | |

OTHER PUBLICATIONS http://www.spassupport.com/seq/werep/westdrep1.html; Building a Standard Hot Tub or Spa Pump (New); Pump Assembly, Standard Spa Pump; Oct. 11, 2002; 4 pages (see transmittal regarding concession of prior art).

\* cited by examiner

Primary Examiner—Dang Le
(74) Attorney, Agent, or Firm—Michael Best & Friedrich LLP

(57) ABSTRACT

An electric motor having a shaft access cover. The electric motor includes a housing that defines an aperture, a stator fixed relative to the housing, a shaft rotatable relative to the housing so the aperture provides access to an end portion of the shaft, and a rotor connected to the shaft for rotation therewith relative to the stator. The end portion of the shaft has a surface adapted for engagement by a tool so a load drivingly connected to the electric motor can be manipulated with respect to the electric motor. The shaft access cover is attachable to the housing for pivotable movement between an unlocked position and a locked position where the shaft access cover substantially covers the aperture. The pivotable movement between the locked and the unlocked positions includes less 360 degrees of pivotable movement.

22 Claims, 4 Drawing Sheets

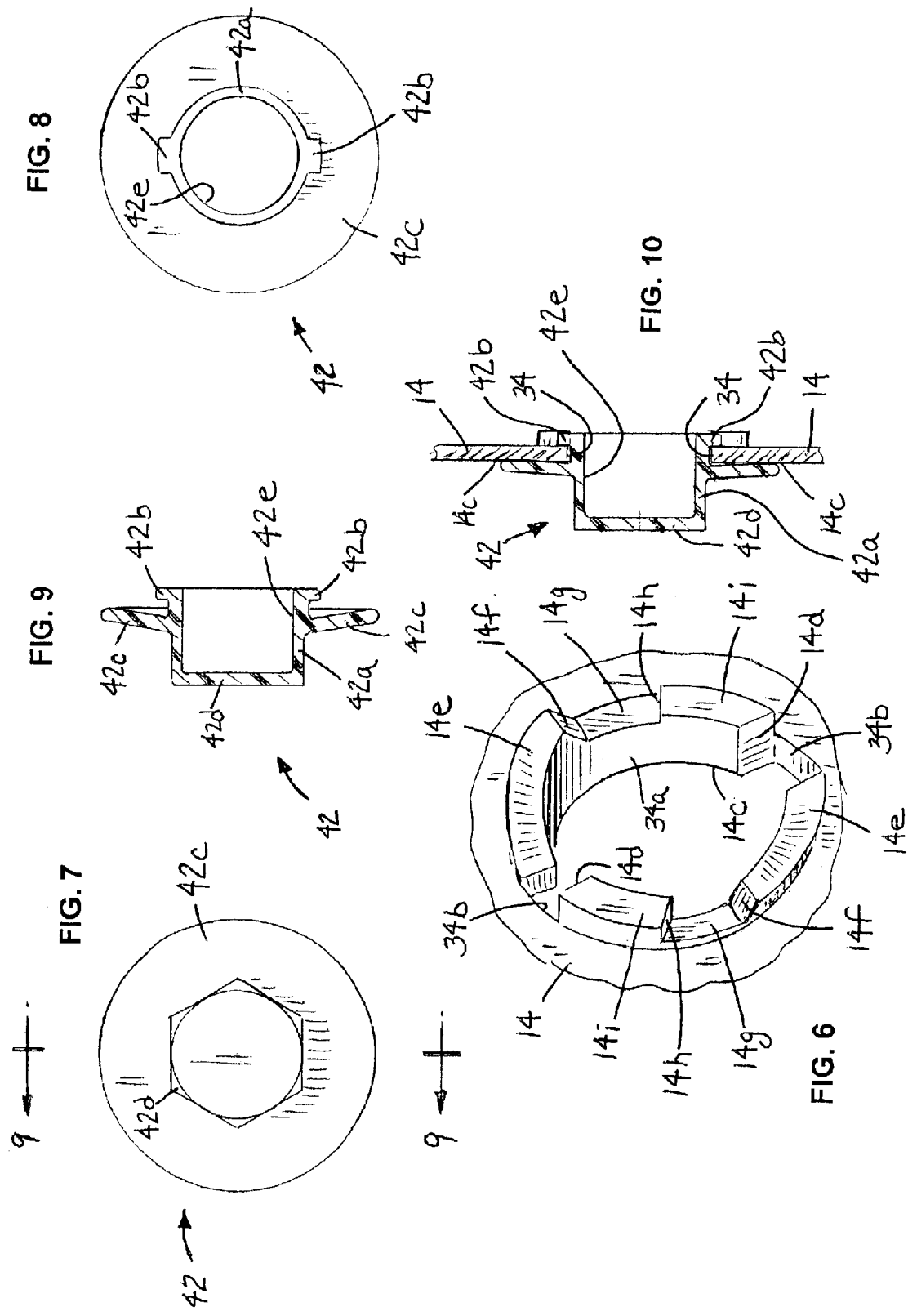

US 6,800,975 B2

ELECTRIC MOTOR SHAFT ACCESS COVER

BACKGROUND OF THE INVENTION

The present invention relates to electric motors, and more particularly to shaft access covers for electric motors.

Various shaft access covers have been used to provide access to the shafts of electric motors. Nevertheless, a new shaft access cover that provides enhanced performance and ease of attachment and removal would be welcomed by those in the art.

SUMMARY OF THE INVENTION

The invention provides a shaft access cover that is attachable to the housing of an electric motor for pivotable movement between locked and unlocked positions. The pivotable movement between the locked and unlocked positions includes less than 360 degrees of pivotable movement. Accordingly, the shaft access cover of the invention allows for fast and easy attachment and removal of the shaft access cover.

In one embodiment, the invention provides an electric motor. The electric motor includes a housing that defines an aperture, a stator fixed relative to the housing, a shaft rotatable relative to the housing so the aperture provides access to an end portion of the shaft that has a surface adapted for engagement by a tool, and a rotor connected to the shaft for rotation therewith relative to the stator. The electric motor also includes a shaft access cover. The shaft access cover is attachable to the housing for pivotable movement between an unlocked position and a locked position where the shaft access cover substantially covers the aperture. The pivotable movement between the unlocked and locked positions includes less than 360 degrees of pivotable movement.

In another embodiment, the invention provides an electric motor. The electric motor includes a housing that defines an aperture, a stator fixed relative to the housing, a shaft rotatable relative to the housing so the aperture provides access to an end portion of the shaft that has a surface adapted for engagement by a tool, and a rotor connected to the shaft for rotation therewith relative to the stator. The electric motor also includes a resilient shaft access cover having a flange portion and at least one tab portion. The resilient shaft access cover is attachable to the housing for pivotable movement between an unlocked position and a locked position. When in the unlocked position, the resilient shaft access cover is removable from the housing. When in the locked position, the resilient shaft access cover substantially covers the aperture and a water-tight seal is formed between the flange portion and the housing. The pivotable movement between the unlocked and locked positions includes less than 360 degrees of pivotable movement.

In yet another embodiment, the invention provides an electric motor. The electric motor includes a housing that defines an aperture, a stator fixed relative to the housing, a shaft rotatable relative to the housing so the aperture provides access to an end portion of the shaft that has a surface adapted for engagement by a tool, and a rotor connected to the shaft for rotation therewith relative to the stator. The portion of the housing that defines the aperture includes an inner surface having multiple ramped surfaces. The electric motor also includes a plastic shaft access cover having a concave flange portion and at least one tab portion. The plastic shaft access cover is attachable to the housing for pivotable movement between an unlocked position and a locked position. When in the unlocked position, the resilient shaft access cover is removable from the housing. When in the locked position, the plastic shaft access cover substantially covers the aperture, the concave flange portion biases the at least one tab portion against the inner surface, and a water-tight seal is formed between the concave flange portion and the housing. The pivotable movement between the unlocked and locked positions includes less than 360 degrees of pivotable movement. The at least one tab portion moves along the ramped surfaces during pivotable movement between the unlocked and locked positions.

Further objects of the present invention together with the organization and manner of operation thereof, will become apparent from the following detailed description of the invention when taken in conjunction with the accompanying drawings wherein like elements have like numerals throughout the drawings.

BRIEF DESCRIPTION OF THE DRAWINGS

The present invention is further described with reference to the accompanying drawings, which show an embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," and "coupled" are used broadly and encompass both direct and indirect mountings, connections, and couplings. Further, "connected" and "coupled" are not restricted to physical or mechanical connections or couplings.

FIG. 6 illustrates an inner perspective view of the portion of the electric motor illustrated in FIG. 5.

FIG. 7 illustrates a top view of the shaft access cover illustrated in FIG. 1.

FIG. 8 illustrates a bottom view of the shaft access cover illustrated in FIG. 1.

FIG. 9 illustrates a sectional view of the shaft access cover taken along line 9—9 in FIG. 7.

FIG. 10 illustrates a section view of the shaft access cover attached to the electric motor in a locked position taken along line 11—11 in FIG. 3.

DETAILED DESCRIPTION

Figure 1:
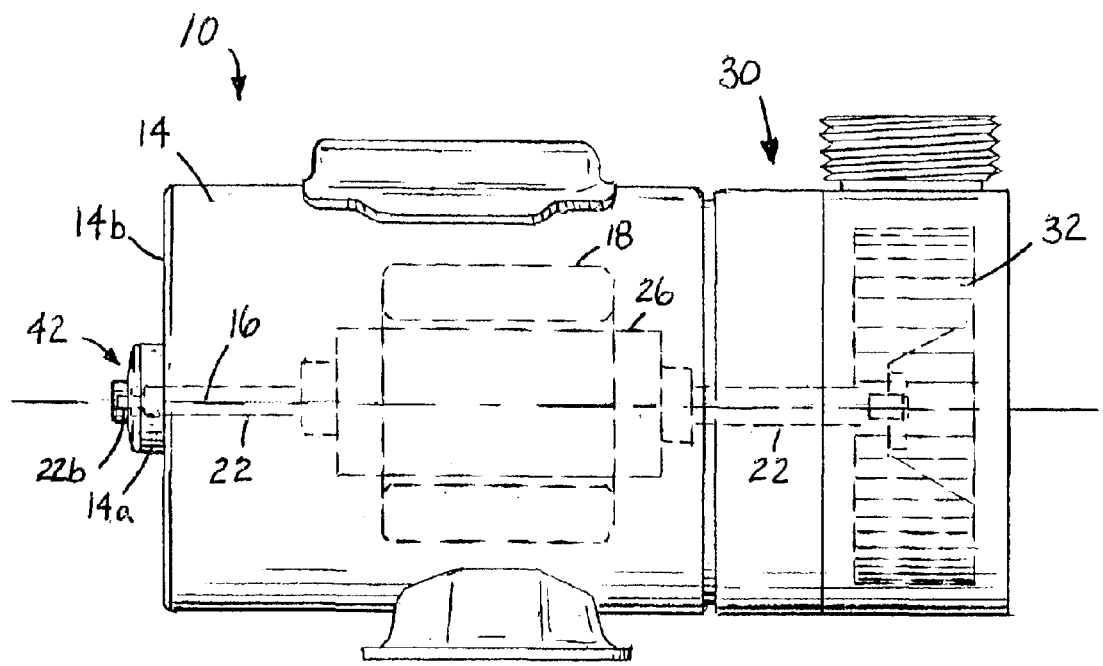
FIG. 1 illustrates an electric motor including a shaft access cover according to the invention.

FIGS. 1–4 illustrate an electric motor 10 that includes a housing 14, a stator 18 fixed relative to the housing 14, a shaft 22 rotatable relative to the housing 14 about an axis 16, and a rotor 26 connected to the shaft 22 for rotation therewith relative to the stator 18. The electric motor 10 is drivingly connected to a load 30. The illustrated load 30 is a fluid pump having an impeller 32. The impeller 32 is connected to the shaft 22 for rotation therewith relative to the housing of the pump 30. In other embodiments, other types of loads may be drivingly connected to the motor 10.

Figure 2:
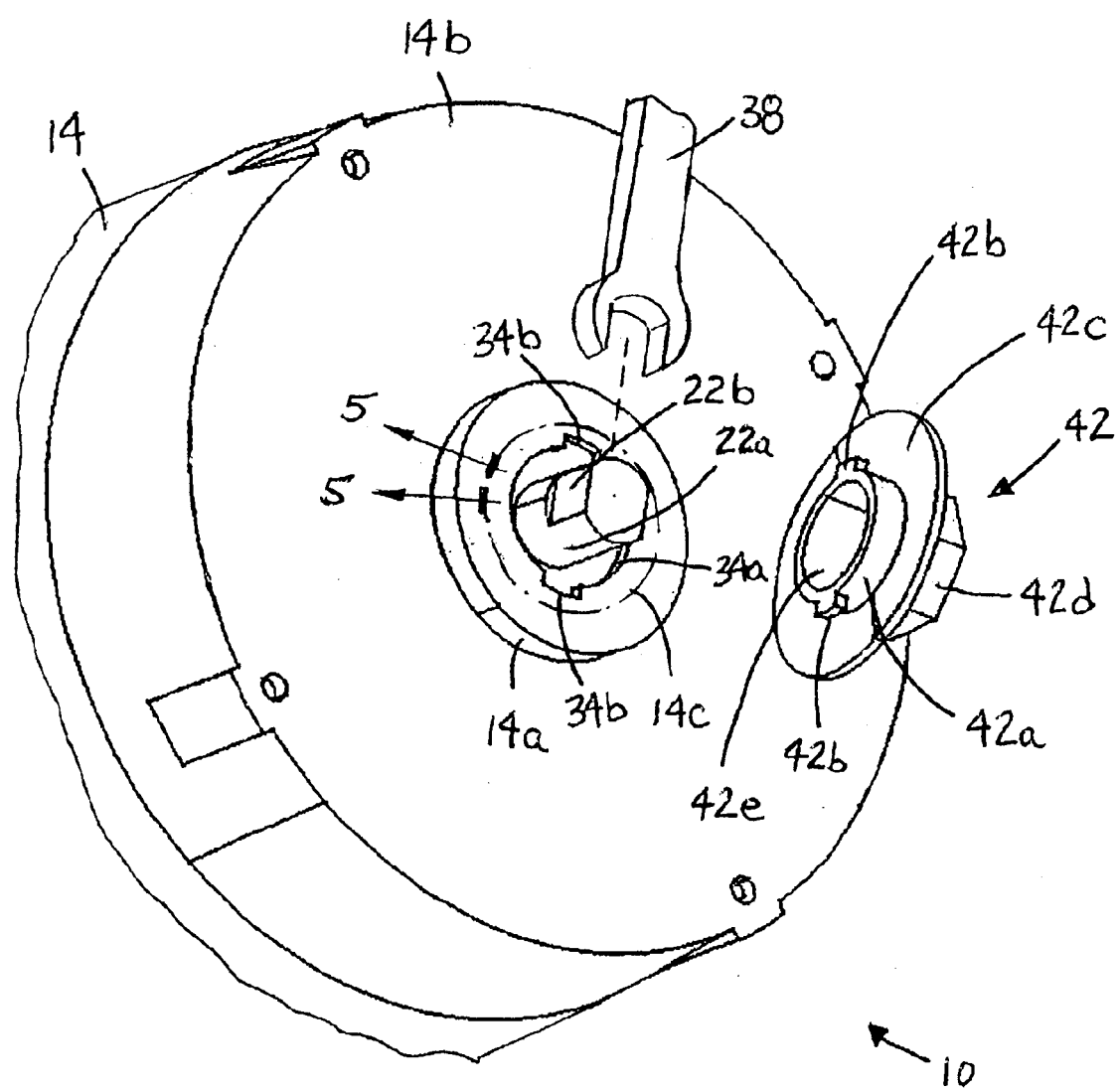
FIG. 2 illustrates the shaft access cover illustrated in FIG. 1 removed from the electric motor.

As shown in FIG. 2, the housing 26 defines an access aperture 34. In the illustrated embodiment, a bearing hub 14a in an end frame 14b of the housing 14 defines the aperture 34. The aperture 34 includes a generally cylindrical portion 34a and two slot portions 34b. The slot portions 34b are diametrically opposed.

Figure 5:
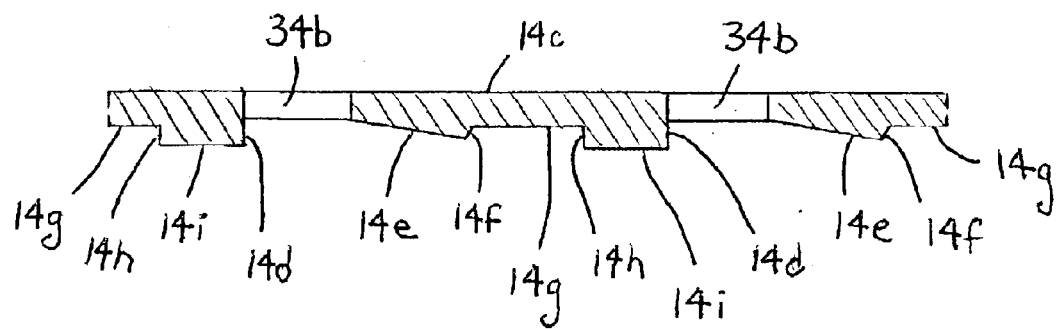
FIG. 5 illustrates a developed view of a portion of the electric motor taken along line 5—5 in FIG. 2.

FIG. 5 illustrates a developed view of and FIG. 6 illustrates an inner perspective view of the portion of the housing 14 that defines the aperture 34. The housing 14 includes an outer surface 14c and an inner surface. As illustrated in FIGS. 2, 5, and 10, the outer surface 14c is substantially planar. The inner surface includes unlocked position stops 14d, gradual ramp portions 14e, steep ramp portions 14f, locked position portions 14g, locked position stops 14h, and stop plateaus 14i. The unlocked position stops 14d and the gradual ramp portions 14c are each adjacent a respective slot portion or unlocked position portion 34b.

The aperture 34 provides access to an end portion 22a of the shaft 22. In most embodiments, the end portion 22a includes a surface adapted for engagement by a tool. In the illustrated embodiment, the surface adapted for engagement by a tool includes a wrench flat 22b for engagement by a wrench 38. In other embodiments, the surface adapted for engagement by a tool may include any surface that is adapted for engagement by a tool to either rotate the shaft 22 or hold the shaft 22 stationary (e.g., a screwdriver slot for engagement by a screwdriver). The shaft 22 is either rotated or held stationary by a tool for manipulation of the load 30 with respect to the electric motor 10. The end portion 22a is illustrated extending axially through the aperture 34 and outwardly from the housing 14. In other embodiments, the end portion 22a may be alternatively disposed with respect to the housing.

Figure 4:
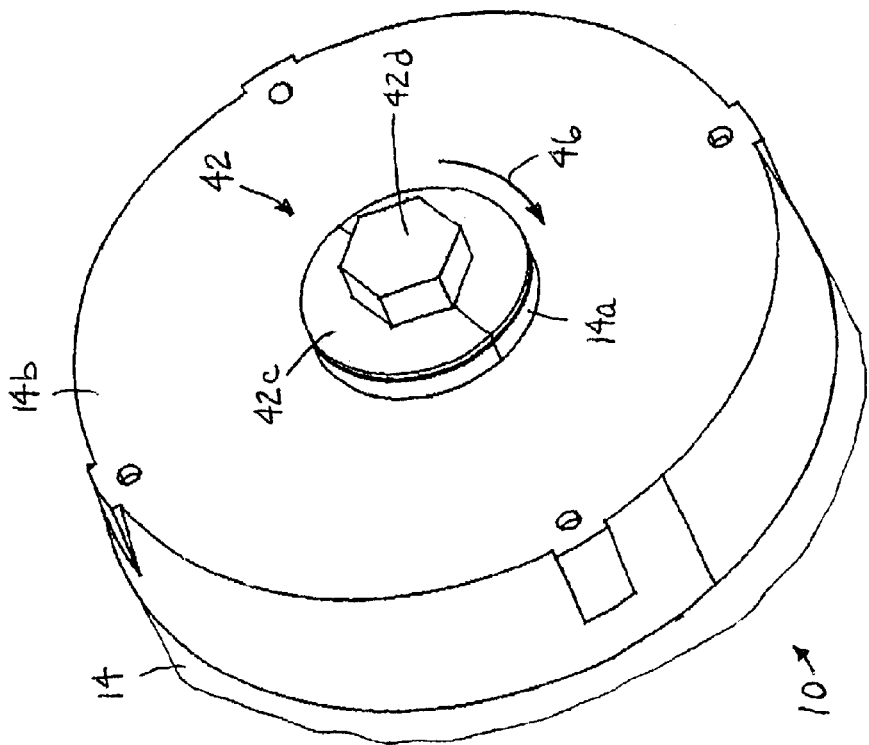
FIG. 4 illustrates the shaft access cover illustrated in FIG. 1 attached to the electric motor in an unlocked position.

The motor 10 includes a shaft access cover 42. The shaft access cover 42 is attachable to the housing 14 for pivotable movement between a locked position (FIG. 3) and an unlocked position (FIG. 4). The pivotable movement between the locked and unlocked positions includes less than 360 degrees of pivotable movement. In the illustrated embodiment, the pivotable movement between the locked and unlocked positions includes less than 180 degrees of pivotable movement. As illustrated in FIGS. 2 and 7–10, the shaft access cover 42 includes a cylindrical body portion 42a, tab portions 42b, a flange portion 42c, and an outer portion 42d. The tab portions 42b extend radially outward from a first end portion of the body portion 42a. The tab portions 42b are diametrically opposed. In the illustrated embodiment, the body portion 42a and the tab portions 42b are sized substantially similar to the cylindrical portion 34a and the slot portions 34b, respectively. The flange portion 42c extends outwardly from a middle portion of the body portion 42a. As illustrated in FIG. 9, the flange portion 42c includes a concave shape. The concave shape of the flange portion 42c biases the shaft access cover 42 with respect to the housing 14 as discussed further below. The outer portion 42d surrounds a second end portion of the body portion 42a. The illustrated outer portion 42 includes a hex shape and is adapted for engagement by a tool for pivotably moving the shaft access cover 42 between the locked and unlocked positions. In the illustrated embodiment, the shaft access cover 42 defines a recess 42e. The recess 42e is sized to receive the end portion 22a extending axially past the housing 14. As discussed above, the shaft 22 may not extend axially past the housing 14 in other embodiments.

For assembly of the shaft access cover 42 to the electric motor 10, the shaft access cover 42 is first attached to the housing 14 in the unlocked position. To attach the shaft access cover 42 to the housing 14 in the unlocked position, the tab portions 42b are aligned with the slot portions 34b and the entire shaft access cover 42 is moved axially toward the housing 14 until the flange portion 42c contacts the outer surface 14c. When in the unlocked position, the flange portion 42c does not bias the shaft access cover 42 with respect to the housing 14. Additionally, the shaft access cover 42 is axially moveable with respect to the housing 14 so the shaft access cover 38 can be removed from the housing 14.

The shaft access cover 42 is moved from the unlocked position to the locked position by pivotably moving the shaft access cover 42 in a counter-clockwise direction as indicated by arrow 46 in FIG. 4. A tool (e.g., a wrench) may be utilize to engage the outer surface 42d for such movement. For movement from the unlocked position to the locked position, the tab portions 42b move from the unlocked position portions 34b toward the gradual ramp portions 14e. In the illustrated embodiment, the thickness of each gradual ramp portion 14e adjacent the unlocked position portion 34b is substantially similar to the axial distance defined between the tab portion 42b and the flange portion 42c when the flange portion 42c is not deflected (FIG. 9). Thus, the tab portions 42b are allowed to contact the gradual ramp portions 14e and begin pivotable movement toward the locked position without requiring axial deflection of the shaft access cover 42. In other embodiments, such deflection may be necessary to begin movement of the shaft access cover 42 from the unlocked position to the locked position.

As the shaft access cover 42 continues to pivot toward the locked position, the thickness of the gradual ramp portion 14e increases and thus the flange portion 42c begins to axially deflect. Such deflection biases the tab portions 42b against the inner surface of the housing 14. The flange portion 42c remains in a deflected position until the shaft access cover 42 is returned to the unlocked position.

The tab portions 42b continue to move up against the gradual ramp portions 14e until the tab portions 42b transition to the steep ramp portions 14f. The tab portions 42b then move down along the steep ramp portions 14f to the locked position portions 14g. The locked position stops 14h restrict further pivotable movement of the tab portions 42b. In the illustrated embodiment, the thickness of each stop plateau 14i is greater than the axial distance defined between the tab portions 42b and the flange portion 42c when the flange portion 42c is completely deflected. Accordingly, the inner surface restricts movement of the shaft access cover 42 beyond the locked position.

When in the locked position, the shaft access cover substantially covers the aperture 34. Additionally, the bias provided by the flange portion creates a water-tight seal between the flange portion 42c and the outer surface 14c. The water tight seal restricts the entry of water and other contaminants into the aperture 34. Such restriction is desirable because water and other contaminants may affect the operation of the internal workings of the electric motor 10 such as a bearing housed in the bearing hub 14a, the stator 18, the rotor 26, and/or electrical components inside the housing 14. The shaft access cover 42 cannot be removed from the housing 14 without moving the shaft access cover 42 to the unlocked position.

Figure 3:
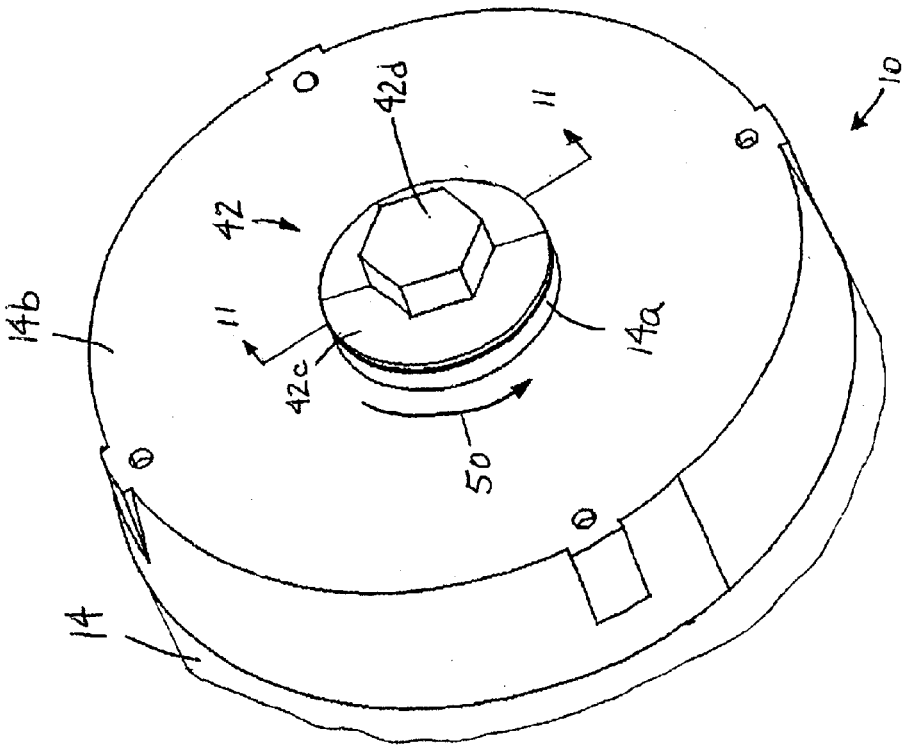
FIG. 3 illustrates the shaft access cover illustrated in FIG. 1 attached to the electric motor in a locked position.

To remove the shaft access cover 42 from the electric motor 10, the shaft access cover 42 is moved from the locked position to the unlocked position by pivotably moving the shaft access cover 42 in a clockwise direction as indicated by arrow 50 in FIG. 3. A tool (e.g., a wrench) may be utilize to engage the outer surface 42d for such movement. Designing the engagement between the shaft access cover 42 and the housing 14 to require utilization of a tool for such movement is desirable because it restricts inadvertent removal of the shaft access cover 42.

For movement from the locked position to the unlocked position, each tab portion 42b moves from the locked position portion 14g toward the steep ramp portion 14f. In the illustrated embodiment, the degree of inclination of the steep ramp portion 14f defines the maximum amount of force necessary to move the shaft access cover 42 from the locked position to the unlocked position. In other embodiment, the inner surface may be alternatively designed. The tab portions 42b continue to move up against the steep ramp portions 14f until the tab portions 42b transition to the gradual ramp portions 14f. The tab portions 42b then move down along the gradual ramp portions 14e to the unlocked position portions 34b. The unlocked position stops 14d restrict further pivotable movement of the tab portions 42b. As discussed above, the thickness of each stop plateau 14i is designed to restrict movement of the shaft access cover 42 beyond the unlocked position.

When in the unlocked position, the shaft access cover 42 can be axially removed from the housing 14. The end portion 42 can then be engaged with a tool 38 for manipulation of the load 30 with respect to the electric motor 10.

In the illustrated embodiment, the shaft access cover 42 is constructed of a resilient material such as plastic. The resiliency of the shaft access cover 42 allows the flange portion 42c to bias the shaft access cover 42 with respect to the housing 14. Additionally, the resilience of the shaft access cover 42 allows the tab portions 42b to flex and thereby prevent breakage of the shaft access cover 42 due to inconsistency in the size of the shaft access cover 42 and/or the housing 14. Thus, the shaft access cover 42 is reusable.

It should be understood that the illustrated construction of the motor 10 is merely shown and described as an example of one such motor. In alternative constructions, the motor may include an aperture in the housing and a shaft access cover that vary in shape and/or size with respect to the aperture 34 and the shaft access cover 42.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An electric motor comprising:
   a housing defining an aperture;
   a stator fixed relative to the housing;
   a shaft rotatable relative to the housing so the aperture provides access to an end portion of the shaft, the end portion of the shaft having a surface adapted for engagement by a tool;
   a rotor connected to the shaft for rotation therewith relative to the stator; and
   a shaft access cover attachable to the housing for pivotable movement between a locked position and an unlocked position, the shaft access cover substantially covering the aperture in the locked position, and the pivotable movement between the locked and unlocked positions including less than 360 degrees of pivotable movement, wherein the shaft access cover includes a flange portion and at least one tab portion, and wherein the flange portion biases the at least one tab portion against the housing when the shaft access cover is in the locked position.

2. An electric motor as claimed in claim 1, wherein the housing includes an end frame, and wherein the end frame defines the aperture.

3. An electric motor as claimed in claim 1, wherein the pivotable movement between the locked and unlocked positions includes less than 180 degrees of pivotable movement.

4. An electric motor as claimed in claim 1, wherein the housing includes a second aperture, wherein the shaft extends through the second aperture for connection to a load, and wherein the surface adapted for engagement by a tool is engagable by a tool for manipulation of the load with respect to the electric motor.

5. An electric motor as claimed in claim 1, wherein the surface adapted for engagement by a tool includes a wrench flat.

6. An electric motor as claimed in claim 1, wherein the surface adapted for engagement by a tool includes a screwdriver slot.

7. An electric motor as claimed in claim 1, wherein the housing is disposed between the flange portion and the at least one tab portion.

8. An electric motor as claimed in claim 1, wherein the flange portion includes a concave portion.

9. An electric motor as claimed in claim 1, wherein the shaft access cover further includes an outer portion adapted for engagement by a tool.

10. An electric motor as claimed in claim 9, wherein the outer portion adapted for engagement by a tool includes a hex head.

11. An electric motor as claimed in claim 1, wherein the flange portion is increasingly deflected against the housing as the shaft access cover is pivoted from the unlocked position to the locked position.

12. An electric motor comprising:
    a housing defining an aperture;
    a stator fixed relative to the housing;
    a shaft rotatable relative to the housing so the aperture provides access to an end portion of the shaft, the end portion of the shaft having a surface adapted for engagement by a tool;
    a rotor connected to the shaft for rotation therewith relative to the stator; and
    a shaft access cover attachable to the housing for pivotable movement between a locked position and an unlocked position, the shaft access cover substantially covering the aperture in the locked position, and the pivotable movement between the locked and unlocked positions including less than 360 degrees of pivotable movement, wherein the shaft access cover includes a concave flange portion, and wherein a water-tight seal is formed between the concave flange portion and the housing when the shaft access cover is in the locked position.

13. An electric motor as claimed in claim 12, wherein the portion of the housing that defines the aperture includes an inner surface adapted to receive the at least one tab, the inner surface having multiple ramped surfaces that the at least one tab portion moves along when pivotably moving between the locked and unlocked positions.

14. An electric motor as claimed in claim 12, wherein the shaft access cover is constructed of a resilient material.

15. An electric motor as claimed in claim 12, wherein the shaft access cover is constructed of plastic.

16. An electric motor as claimed in claim 12, wherein the shaft access cover is removable from the housing when the shaft access cover is in the unlocked position.

17. An electric motor as claimed in claim 12, wherein access to the shaft and removal of the shaft access cover are restricted when the shaft access cover is in the locked position.

18. An electric motor as claimed in claim 12, wherein a force between the concave flange portion and the housing increases as the shaft access cover is pivoted from the unlocked position to the locked position.

19. An electric motor comprising:
   a housing defining an aperture;
   a stator fixed relative to the housing;
   a shaft rotatable relative to the housing so the aperture provides access to an end portion of the shaft, the end portion of the shaft having a surface adapted for engagement by a tool;
   a rotor connected to the shaft for rotation therewith relative to the stator; and
   a resilient shaft access cover having a flange portion and at least one tab portion, the resilient shaft access cover attachable to the housing for pivotable movement between a locked position and an unlocked position, the resilient shaft access cover substantially covering the aperture in the locked position, the resilient shaft access cover removable from the housing in the unlocked position, a water-tight seal forming between the flange portion and the housing when the resilient shaft access cover is in the locked position, and the pivotable movement between the locked and unlocked positions including less than 360 degrees of pivotable movement.

20. An electric motor as claimed in claim 19, wherein the at least one tab is increasingly pulled against an inner surface of the housing as the resilient shaft access cover is pivoted from the unlocked position to the locked position.

21. An electric motor comprising:
   a housing defining an aperture, the portion of the housing defining the aperture including an inner surface having multiple ramped surfaces;
   a stator fixed relative to the housing;
   a shaft rotatable relative to the housing so the aperture provides access to an end portion of the shaft, the end portion of the shaft having a surface adapted for engagement by a tool;
   a rotor connected to the shaft for rotation therewith relative to the stator; and
   a plastic shaft access cover having a generally concave flange portion and at least one tab portion, the plastic shaft access cover attachable to the housing for pivotable movement between a locked position and an unlocked position, the plastic shaft access cover substantially covering the aperture in the locked position, the plastic shaft access cover removable from the housing in the unlocked position, the generally concave flange portion biasing the at least one tab portion against the inner surface when the plastic shaft access cover is in the locked position, a water-tight seal forming between the generally concave flange portion and the housing when the plastic shaft access cover is in the locked position, the pivotable movement between the locked and unlocked positions including less than 360 degrees of pivotable movement, and the at least one tab portion moving along the ramped surfaces during pivotable movement between the locked and unlocked positions.

22. An electric motor as claimed in claim 21, wherein a force between the generally concave flange portion and the housing increases as the plastic shaft access cover is pivoted from the unlocked position to the locked position, and wherein the force results in the water-tight seal.

* * * * *